United States Patent
Vandonkelaar

(10) Patent No.: US 10,751,609 B2
(45) Date of Patent: Aug. 25, 2020

(54) MAPPING ARENA MOVEMENTS INTO A 3-D VIRTUAL WORLD

(71) Applicant: Zero Latency PTY LTD, North Melbourne (AU)

(72) Inventor: Scott Vandonkelaar, Alphington (AU)

(73) Assignee: ZERO LATENCY PTY LTD, North Melbourne (AU)

( * ) Notice: Subject to any disclaimer, the term of this patent is extended or adjusted under 35 U.S.C. 154(b) by 24 days.

(21) Appl. No.: 15/344,371

(22) Filed: Nov. 4, 2016

(65) Prior Publication Data

US 2018/0043247 A1 Feb. 15, 2018

Related U.S. Application Data

(60) Provisional application No. 62/374,661, filed on Aug. 12, 2016.

(51) Int. Cl.
*A63F 13/213* (2014.01)
*A63F 13/428* (2014.01)
*A63F 13/26* (2014.01)
*A63F 13/35* (2014.01)

(52) U.S. Cl.
CPC ............ *A63F 13/213* (2014.09); *A63F 13/26* (2014.09); *A63F 13/428* (2014.09); *A63F 13/35* (2014.09); *A63F 2300/8082* (2013.01)

(58) Field of Classification Search
CPC .................................................... A63F 13/213
See application file for complete search history.

(56) References Cited

U.S. PATENT DOCUMENTS

| 5,490,239 A | 2/1996 | Myers |
| 5,509,810 A | 4/1996 | Schertz et al. |
| 5,717,414 A | 2/1998 | Bergsneider et al. |
| 5,751,289 A | 5/1998 | Myers |
| 5,997,439 A | 12/1999 | Oshuga et al. |
| 6,801,637 B2 | 10/2004 | Voronka et al. |
| 6,950,123 B2 | 9/2005 | Martins |

(Continued)

FOREIGN PATENT DOCUMENTS

| CN | 101859439 A | 10/2010 |
| EP | 1368788 | 12/2010 |

(Continued)

OTHER PUBLICATIONS

Arar et al., Estimating Fusion Weights of a Multi-Camera Eye Tracking System by Leveraging User Calibration Data, Proceedings of the Ninth Biennial ACM Symposium on Eye Tracking Research and Applications, 2016, pp. 225-228.

(Continued)

*Primary Examiner* — Jay Trent Liddle
(74) *Attorney, Agent, or Firm* — Jennifer Hayes; Nixon Peabody LLP

(57) ABSTRACT

A virtual reality system maps primarily 2-D arena movements into 3-D virtual worlds. Movement into specific physical arena areas or directions triggers virtual world effects such as changing elevation, moving on a different elevation, walking on walls or walking on the outer surface of an object. The 3D-VR system supports multiple simultaneous people at different virtual elevations and provides a realistic, interesting and exciting simulation experience.

17 Claims, 7 Drawing Sheets

(56) References Cited

U.S. PATENT DOCUMENTS

| | | |
|---|---|---|
| 6,972,787 B1 | 12/2005 | Allen et al. |
| 7,046,214 B2 | 5/2006 | Ebersole et al. |
| 7,071,898 B2 | 7/2006 | Hobgood et al. |
| 7,139,767 B1 | 11/2006 | Taylor |
| 7,225,548 B2 | 6/2007 | Sieracki et al. |
| 7,262,747 B2 | 8/2007 | Ebersole et al. |
| 7,479,967 B2 | 1/2009 | Bachelder et al. |
| 7,639,233 B2 | 12/2009 | Marks |
| 7,808,524 B2 | 10/2010 | Park et al. |
| 7,918,808 B2 | 4/2011 | Simmons |
| 8,115,814 B2 | 2/2012 | Iwase et al. |
| 8,131,015 B2 | 3/2012 | Hildreth |
| 8,537,113 B2 | 9/2013 | Weising et al. |
| 8,655,020 B2 | 2/2014 | Saptharishi et al. |
| 8,698,875 B2 | 4/2014 | Anguelov et al. |
| 8,705,799 B2 | 4/2014 | White et al. |
| 8,818,420 B2 | 8/2014 | Schatzberg et al. |
| 8,825,187 B1 | 9/2014 | Hamrick |
| 8,920,172 B1 | 12/2014 | Wilmink et al. |
| 8,971,574 B2 | 3/2015 | Ye et al. |
| 8,988,343 B2 | 3/2015 | Fei et al. |
| 8,988,508 B2 | 3/2015 | Yahav et al. |
| 9,068,843 B1 | 6/2015 | Sohn et al. |
| 9,147,260 B2 | 9/2015 | Hampapur et al. |
| 9,159,152 B1* | 10/2015 | Glover .................. G06T 13/40 |
| 9,215,262 B2 | 12/2015 | Oyman |
| 9,221,506 B1 | 12/2015 | Georgeson et al. |
| 9,223,786 B1 | 12/2015 | Hamrick et al. |
| 9,311,742 B1 | 4/2016 | Glover et al. |
| 9,443,352 B1 | 9/2016 | Glover et al. |
| 10,071,306 B2 | 9/2018 | Vandonkelaar |
| 2003/0120183 A1 | 6/2003 | Simmons |
| 2004/0063481 A1 | 4/2004 | Wang |
| 2004/0104935 A1 | 6/2004 | Williamson et al. |
| 2004/0155962 A1 | 8/2004 | Marks |
| 2005/0168486 A1 | 8/2005 | Sato |
| 2005/0272517 A1 | 12/2005 | Funk et al. |
| 2006/0055706 A1 | 3/2006 | Perlman |
| 2006/0247070 A1 | 11/2006 | Funk et al. |
| 2007/0132785 A1 | 6/2007 | Ebersole et al. |
| 2007/0242886 A1 | 10/2007 | St. John |
| 2009/0040308 A1 | 2/2009 | Temovskiy |
| 2009/0187389 A1* | 7/2009 | Dobbins .................. G06F 3/011 703/6 |
| 2009/0209343 A1 | 8/2009 | Foxlin et al. |
| 2009/0278917 A1* | 11/2009 | Dobbins .................. G06F 3/011 348/53 |
| 2010/0075284 A1 | 3/2010 | Kozhevnikov et al. |
| 2010/0166260 A1 | 7/2010 | Huang et al. |
| 2010/0188401 A1 | 7/2010 | Gordon et al. |
| 2010/0210377 A1 | 8/2010 | Lock |
| 2012/0086728 A1 | 4/2012 | McArdle et al. |
| 2012/0142415 A1 | 6/2012 | Lindsay |
| 2012/0262558 A1 | 10/2012 | Boger |
| 2012/0321173 A1 | 12/2012 | Mitarai |
| 2012/0327194 A1 | 12/2012 | Shiratori |
| 2013/0063432 A1 | 3/2013 | Kaps et al. |
| 2013/0064427 A1 | 3/2013 | Picard et al. |
| 2013/0076616 A1 | 3/2013 | Csaszar et al. |
| 2013/0190086 A1* | 7/2013 | Maison ............... G06K 9/00369 463/31 |
| 2014/0272837 A1 | 9/2014 | Becker et al. |
| 2015/0088863 A1 | 3/2015 | Horiba |
| 2015/0097719 A1* | 4/2015 | Balachandreswaran ..................... G01B 11/002 342/147 |
| 2015/0116316 A1 | 4/2015 | Fitzgerald et al. |
| 2015/0124084 A1 | 5/2015 | Ikenoue |
| 2015/0149104 A1 | 5/2015 | Baker et al. |
| 2015/0193949 A1 | 7/2015 | Katz et al. |
| 2015/0193979 A1 | 7/2015 | Grek |
| 2015/0193983 A1 | 7/2015 | Katz et al. |
| 2015/0208058 A1 | 7/2015 | Denizot et al. |
| 2015/0260474 A1 | 9/2015 | Rublowsky et al. |
| 2015/0286275 A1 | 10/2015 | Huang et al. |
| 2015/0302648 A1 | 10/2015 | Zhang |
| 2016/0026253 A1 | 1/2016 | Bradski et al. |
| 2016/0027213 A1* | 1/2016 | Burns ..................... G06F 3/011 345/633 |
| 2016/0027220 A1 | 1/2016 | Jimenez |
| 2016/0041391 A1 | 2/2016 | Van Curen et al. |
| 2016/0049085 A1 | 2/2016 | Beeson |
| 2016/0054837 A1 | 2/2016 | Stafford |
| 2016/0063731 A1 | 3/2016 | Yamamoto et al. |
| 2016/0124502 A1 | 5/2016 | Sawyer et al. |
| 2016/0225156 A1 | 8/2016 | Ikenoue |
| 2016/0232715 A1* | 8/2016 | Lee ........................ G06T 19/006 |
| 2016/0257000 A1 | 9/2016 | Guerin et al. |
| 2016/0364910 A1* | 12/2016 | Higgins ............... G02B 27/017 |
| 2017/0039881 A1 | 2/2017 | Belch et al. |
| 2017/0274275 A1 | 9/2017 | Vandonkelaar |
| 2017/0274277 A1 | 9/2017 | Vandonkelaar |
| 2017/0277940 A1 | 9/2017 | Vandonkelaar |
| 2017/0289221 A1* | 10/2017 | Khalid .................... H04L 65/60 |
| 2017/0319956 A1 | 11/2017 | Vandonkelaar |
| 2018/0150686 A1 | 5/2018 | Vandonkelaar |

FOREIGN PATENT DOCUMENTS

| | | |
|---|---|---|
| WO | 2006103662 A2 | 10/2006 |
| WO | WO 2015/048890 A1 | 4/2015 |
| WO | 2015123771 A1 | 8/2015 |
| WO | WO 2015/123774 A1 | 8/2015 |
| WO | 2018/002698 A1 | 1/2018 |
| WO | 2018/029515 A1 | 2/2018 |
| WO | 2018/037269 A1 | 3/2018 |

OTHER PUBLICATIONS

Ehrl et al., A Reliability Measure for Merging Data from Multiple Cameras in Optical Motion Correction, Proc. ISMRM Scientific Workshop—Motion Correction in MRI, 2014, 1 page.

Guerra-Filhol, Optical Motion Capture: Theory and Implementation, Journal of Theoretical and Applied Informatics (RITA), 2005, vol. 12(2), pp. 1-29.

Mannberg et al., High Precision Real-Time 3D Tracking Using Cameras, Infotech at Aerospace, American Institute of Aeronautics and Astronautics, 2011, pp. 1-11.

Vasylevska et al., Influence of Vertical Navigation Metaphors and Presence, Proceedings of the International Society for Presence Research, 2014, pp. 205-212.

International Search Report and Written Opinion for PCT/IB2016/057844 dated Feb. 22, 2017, 15 pages.

International Search Report and Written Opinion for PCT/IB2016/057845 dated Mar. 3, 2017, 10 pages.

International Search Report and Written Opinion for PCT/IB2016/000374 dated Nov. 15, 2016, 10 pages.

International Search Report and Written Opinion for PCT/IB2016/000381 dated Dec. 23, 2016, 15 pages.

International Search Report and Written Opinion for PCT/IB2017/054513 dated Oct. 13, 2017, 12 pages.

Li, Y., Development of Immersive and Interactive Virtual Reality Environment for Two-Player Table Tennis, Diss. University of Central Lancashire, 2012, pp. 96-99.

International Search Report and Written Opinion for PCT/US2016/000374 dated Nov. 15, 2016, 10 pages.

International Preliminary Report on Patentability for PCT/IB2016/057842 dated Jan. 1, 2019, 6 pages.

International Preliminary Report on Patentability for PCT/IB2016/057844 dated Feb. 12, 2019, 9 pages.

International Preliminary Report on Patentability for PCT/IB2016/000374 dated Sep. 28, 2018, 8 pages.

International Preliminary Report on Patentability for PCT/IB2016/057845 dated Feb. 26, 2019, 7 pages.

\* cited by examiner

MAPPING ARENA MOVEMENTS INTO A 3-D VIRTUAL WORLD

CROSS-REFERENCE TO RELATED APPLICATIONS

The present patent application also claims priority to provisional application No. 62/374,661, entitled "Mapping Arena Movements into a 3-D Virtual World", filed Aug. 12, 2016, the entirety of which is herein incorporated by reference.

BACKGROUND

1. Field

This invention relates to the field of virtual reality and in particular to arena-based virtual reality systems which map arena movements to virtual world movements.

2. Related Art

Virtual reality (VR) systems replicate an environment that simulates a physical presence in places in the real world or an imagined world, allowing the user to interact in that world. Virtual realities artificially create sensory experiences, which can include sight, touch, hearing, and smell. Virtual reality systems have many applications including gaming, training and education.

In an arena-based VR system one or more people physically move around an arena. Each person wears a VR headset that presents generated images that depend on the orientation of the headset and the location of the people within the game arena. People interact with the virtual world by means of a hand-held controller which they point and on which they signal actions typically by pressing keys, buttons or a trigger.

FIG. 1 depicts a prior-art arena-based virtual reality system from the company, Zero Latency. The system uses a plurality of cameras to track objects such as people and controllers with tracking markers attached thereto. Cameras 102 detect tracking markers 108. Cameras 102 are connected to a VR server 110 which analyzes images viewed by cameras 102 and communicates with people 106 and other objects such as game controllers, simulated weapons etc., all of which include tracking markers 108 for observation by cameras 102. Connections 112 between cameras 102 and VR server 110 are hardwired using Ethernet. Communication between VR server 110 and people 106 and other objects for both control and sensing purposes are performed through wireless connectivity. The people 106 carry a backpack PC 116 which interfaces electronically with a form of VR headset and a controller or simulated weapon device carried by the person. The VR system generally tracks the controller and VR headsets orientations and uses a single, average location of each person. The VR server 110 analyzes the camera images and searches for the tracking markers within each image. The VR server 110 controls the color of each tracking marker to make it easier to distinguish between the different tracking markers. Each camera is pre-calibrated so that each image-pixel corresponds to a known direction. The VR server 110 uses the pixel locations of the tracking markers within the camera images to construct 3-dimensional vectors from the cameras' known locations to the tracking markers. The VR server 110 determines the tracking marker arena locations by computing the closest point of the 3-dimensional vector intersections. The VR server 110 averages the tracking marker arena locations to get a 2-dimensional arena location of each person. The VR server 110 maps the 2-dimensional arena person locations into 2-dimensional virtual world locations. The VR server 110 checks the tracking marker locations many times each second. When the VR server 110 detects that a person has moved distance, D, in 2-dimensional direction, X, the VR server 110 typically updates that person's virtual world location by moving distance, D, in 2-dimensional direction, X. The VR server 110 presents each person with a view of the virtual world where the view depends on the person's virtual world location.

Today's arena-based VR systems offer mostly a two-dimensional (2-D) experience. This differs from computer-based simulations where people use a controller to move freely through a three-dimensional (3-D) virtual world. The arena is normally a flat open space permitting 2-D movement. The VR system maps people's arena movements into 2-D movements within the virtual world. Multiple people are at the same elevation within the virtual world. Arena-based VR systems would offer a richer experience if they allowed for three-dimensional movement within the virtual world.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In accordance with aspect of the invention, a system is disclosed that includes a virtual reality server in communication with a plurality of cameras and a plurality of displays, the virtual reality server comprising a memory containing machine readable medium comprising machine executable code having stored thereon instructions for operating a control system comprising at least one processor coupled to the memory, wherein the plurality of cameras are configured to record images of an arena in which at least one person is participating in a virtual reality simulation, wherein the virtual reality server constructs a 3-dimensional virtual world model representing the virtual reality simulation, wherein the virtual reality server receives images from at least two of the plurality of cameras, determines arena movements for each person in the received images, maps each person's arena movements into 3-dimensional movements within the 3-dimensional virtual world model, and outputs a representation of the 3-dimensional virtual world model for display on at least one of the plurality of displays.

In accordance with another aspect of the invention, a computerized method for mapping movements in an arena into a 3-dimensional virtual world is disclosed that includes receiving location information for at least one person in the arena; receiving status from at least one sensory enhancement device; determining that a motion or stimulation status change event has occurred corresponding to a movement in the arena or a sensory enhancement device status change; if a motion or stimulation status change event has occurred, updating a virtual reality model with new motion and sensory stimuli schedules, the new motion corresponding to a 3-dimensional movement in the 3-dimensional virtual world; updating the virtual reality model with new virtual locations corresponding to the 3-dimensional movement; and outputting information to update at least one display and the at least one sensory enhancement device for each person in the 3-dimensional virtual world.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Virtual reality has many applications including training, design assistance and gaming. An arena-based VR system allows users to physically walk through an arena while visualizing movement through a virtual world. One training example is a simulation where security forces clear a multi-floor building and deal with a sniper on a roof-top. Such a scenario requires the VR system to represent multiple people in difference places and at different elevations. Some people may be in a street, other people may be on different floors of a building and other people may be on the roof-top. The VR system gives each person a different view of the virtual world based on the person's location. The VR system translates each person's physical arena movement into movement within the virtual world.

Another training example is a simulation where astronauts repair equipment in outer space. Astronauts may need to exit the spacecraft and use magnetic boots to walk on the outer surface of the spacecraft while repairing outside equipment. The VR system translates each person's physical arena movement into movement on the outer spacecraft surface within the virtual world.

One design assistance VR system allows one or more users to walk through a virtual building representing an architectural design. The users may walk up a virtual staircase and look down on a ground floor room. The VR system translates each person's physical arena movement into movement within rooms and up or down staircases within the virtual world.

The VR system provides an intense, realistic experience that includes multiple senses, walking, running, body movement and touching. Existing computer-based, controller-operated simulations provide a much more limited experience and rely on controller actions such as button clicks and joystick movement. The VR system and the computer-based, controller-operated system both construct a virtual world and support movement and actions within that virtual world. The VR system differs in the way it supports movements, changes of person orientation and interactions with the virtual world.

The 3-dimensional VR (3D-VR) system maps 2-dimensional arena movements into 3-dimensional movements within the virtual world. When the 3D-VR system detects that a person has moved distance, D, in 2-dimensional direction, X, the VR system updates that person's virtual world location by moving distance, D, in 2-dimensional direction, X, and by a vertical displacement, Z. The vertical displacement is non-zero in specific situations defined by the 3D-VR system. The 3D-VR system presents each person with a view of the virtual world where the view depends on the person's 3-dimensional virtual world location.

Figure 2A:
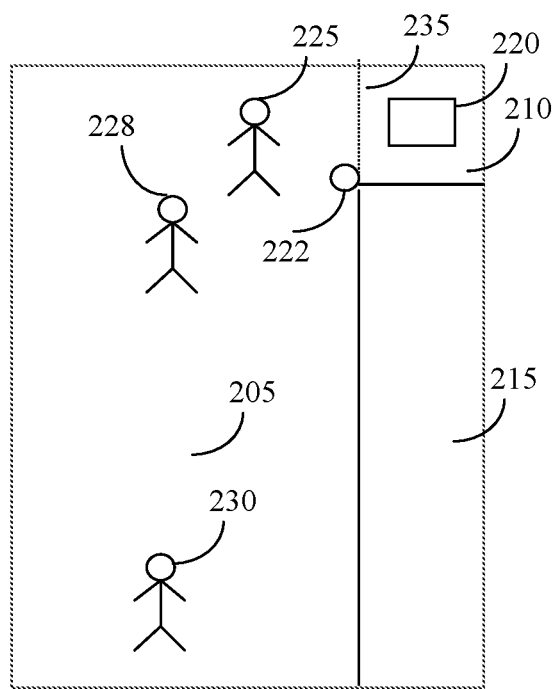
FIG. 2a shows a top-down diagram of an exemplary arena scenario with one person approaching an area that corresponds to an elevator in the virtual world.

FIG. 2a gives an example of a physical arena being split into three areas where each area has a different translation in the virtual world. In FIG. 2a, the arena is depicted as a flat open area with no physical boundaries between the three areas: a main area 205, a transition area 210 and a mezzanine level 215. It will be appreciated that the physical arena may be split into more than three areas and that the different levels may have different names—the use of the terms main area, transition area and mezzanine level are merely exemplary.

In FIG. 2a, the main area 205 represents a ground elevation within the virtual world, the transition area 210 represents an area allowing transition from one elevation to another within the virtual world, and the mezzanine level 215 represents an area of higher elevation within the virtual world. This example illustrates a transition from a building's ground floor to a mezzanine level, but, as explained above, the 3D-VR server supports transitions from any elevation to any other elevation.

In FIG. 2a, three people: person 225, person 228 and person 230 (collectively, people 225, 228 and 230) are standing within the main area 205. People 225, 228 and 230 see a virtual world with a doorway to transition area 210 and mezzanine area 215 at a higher elevation. Person 225 is approaching the transition area 210. In one scenario, person 225 sees an open doorway 235 that leads to the transition area 210. In a second scenario, person 225 sees a closed doorway and has to open the door. The person 225 can open the door in multiple ways including, for example, a) pushing on a physical button 222; b) pushing a virtual button; c) pressing a button on a controller; or d) making a body movement such as a hand wave. The 3D-VR system identifies arm and hand movement by tracking the locations of the tracking markers attached to arms and hands. Haptic plate 220 is an optional component that can be used to simulate movement such as the vibration of a lift or elevator.

The 3D-VR system can apply different arena partitionings at different times. For example, the 3D-VR system may utilize the entire arena for movement when people are outside a virtual building and then split the arena space into for example ground floor and mezzanine when people enter the virtual building. Furthermore, the 3D-VR system may place the mezzanine area to the left in one virtual building and to the right in a second virtual building. The 3D-VR system may make use of physical devices, such as haptic plate 220 or button 222 to indicate a transition from one elevation to another by selecting transition areas associated with these physical devices.

Figure 2B:
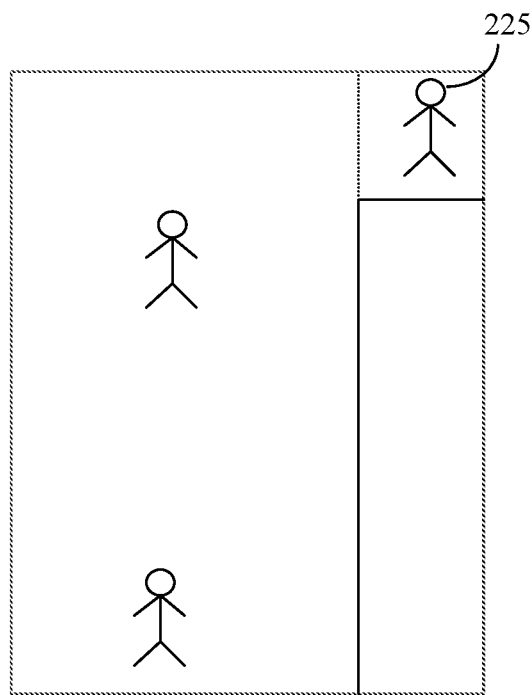
FIG. 2b shows a top-down diagram of an exemplary arena scenario with one person having entered an area that corresponds to an elevator in the virtual world.

FIG. 2b shows an example scenario where person 225 has entered the transition area 210. In this scenario, the person 225 can see three walls of an elevator and can see through the open doorway 235. The person 225 can go back to the main area 205 by leaving through doorway 235 or can signal that he or she wants to transition to another elevation. The person 225 signals wanting to transition to another elevation in multiple ways including, for example, a) pushing on a physical button; b) pushing a virtual button; c) pressing a button on a controller; or d) making a body movement such as a hand wave.

Figure 2C:
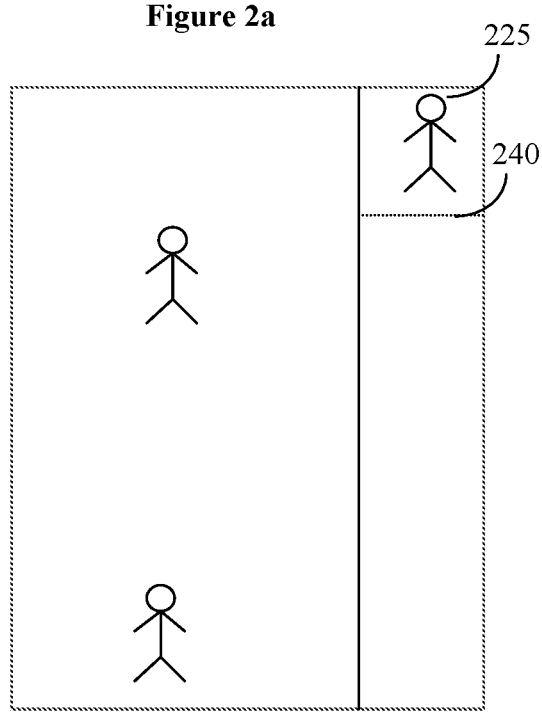
FIG. 2c shows a top-down diagram of an exemplary arena scenario with one person about to leave an area that corresponds to an elevator in the virtual world.

FIG. 2c shows an example scenario where person 225 has changed elevations within the transition area 210. In this scenario, the person 225 can see three walls of an elevator and can see through a different open doorway 240 looking onto the mezzanine area 215. The person 225 can enter the mezzanine area 215 by leaving through doorway 240 or can signal that he or she wants to transition to another elevation as described above.

Figure 2D:
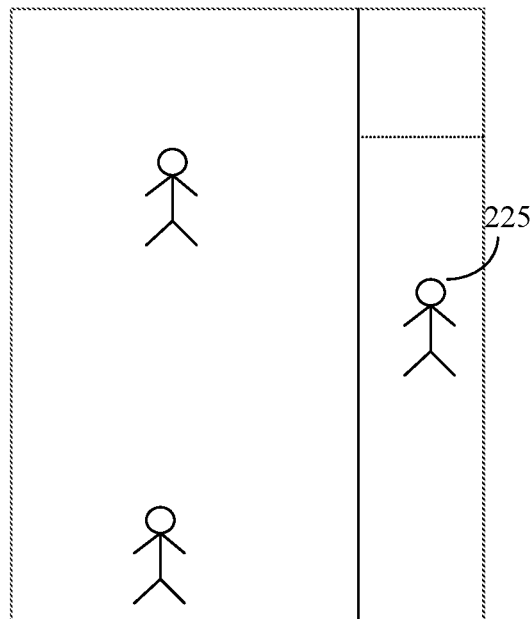
FIG. 2d shows a top-down diagram of an exemplary arena scenario with one person at a higher elevation in the virtual world.

FIG. 2d shows an example scenario where person 225 has entered mezzanine level 215. In this scenario, the person 225 can see main area 205 below containing people 228 and 230 and open doorway 240 looking into the transition area 210. People 228 and 230 can look up to see person 225 on the mezzanine area 215. The 3D-VR system translates the movement of person 225 within the mezzanine area 215 into movements within the mezzanine of the virtual world.

Figure 2E:
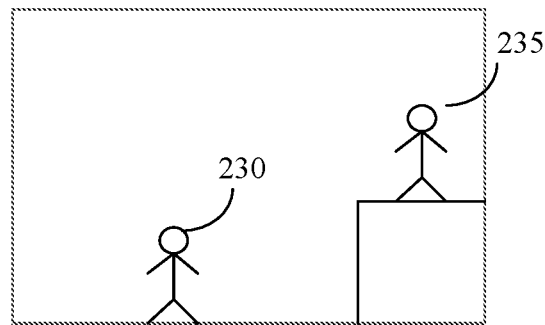
FIG. 2e shows a side-view diagram of an exemplary arena scenario with one person at higher elevation in the virtual world.

FIG. 2e shows a virtual world side-view of the scenario in FIG. 2d. Person 230 in the main area 205 looks up to see person 225 in the mezzanine area 215 at a higher elevation. Person 225 in the mezzanine area 215 looks up to see person 230 in the main area 205 at a lower elevation.

The 3D-VR system encourages people to move between elevations by going through a transition area. The 3D-VR system presents visual, auditory and other sensory cues to discourage direct movement from one elevation to another. Example cues include: showing a wall, showing a dangerous obstacle, sounding an alarm and causing a vibration in a backpack or controller. If a person does move directly from one elevation to another, the system can take actions such as: allowing the person to continue; temporarily or permanently disconnecting the person from the simulation; or penalizing the person from a scoring point of view.

Figure 3A:
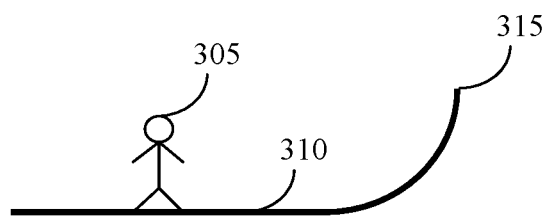
FIG. 3a shows a side-view diagram of an exemplary virtual world scenario with one person standing on a flat surface next to a ramp.

FIGS. 3a-d illustrate another exemplary scenario in accordance with one aspect of the invention. FIG. 3a shows a side-view of a virtual world with person 305 standing on level surface 310 and facing a slope 315. In the real world, person 305 is standing on a level surface and facing a level surface. When person 305 faces virtual slope 315 the 3D-VR system displays a virtual slope to person 305.

Figure 3B:
FIG. 3b shows a side-view diagram of an exemplary virtual world scenario with one person standing on a ramp.

FIG. 3b shows the virtual world after person 305 has moved to the right in the real world. In the virtual world, person 305 is now standing on the slope. In this example, person 305 is shown standing perpendicular to the virtual slope in the virtual world. This simulation is appropriate when the person expects gravity to act perpendicular to the surface such as on the inner surface of a rotating space craft. A different simulation may choose to maintain the person's original orientation perpendicular to the flat surface 310. As the person 305 moves up the slope 315, the 3D-VR system augments the visual display with other sensory experiences including sounds to indicate the physical exertion. In a different scenario the slope is replaced by a vertical wall and the person's movement within the arena corresponds to movement on the surface of the virtual wall.

Figure 3C:
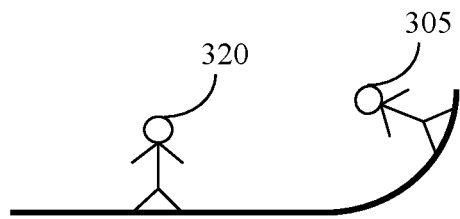
FIG. 3c shows a side-view diagram of an exemplary virtual world scenario with one person standing on a flat surface and one person standing on a ramp.

FIG. 3c shows person 320 standing on a flat virtual surface and person 305 standing on a virtual slope. In the real world they are both standing on the flat surface of the arena. The 3D-VR system translates person 305 real-world arena location into a position on the slope in the virtual world and adjusts person 305's orientation. Person 320 sees person 305 on the virtual slope. Person 305 sees person 320 on what appears to be a virtual flat surface from the side-view of FIG. 3c. Person 305 sees person 320 on a upward flat slope because of his orientation.

Figure 3D:
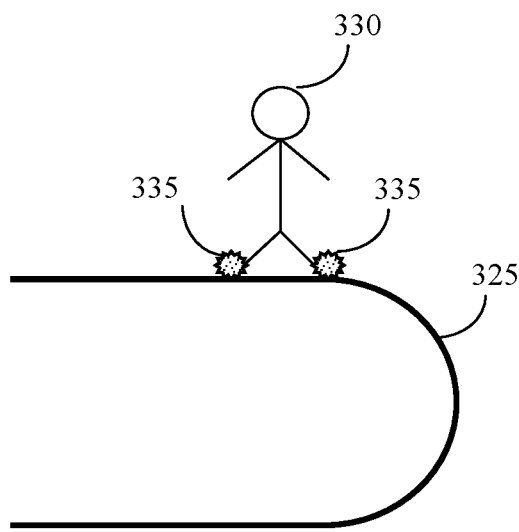
FIG. 3d shows a side-view diagram of an exemplary virtual world scenario with one person standing on the outer surface of an object.

FIG. 3d shows person 330 standing on the outer surface 325 of an object in the virtual world. FIG. 3d could represent a simulation of an astronaut wearing magnetic boots standing on the outer surface of a space craft. Re-directed walking normally allows a person to appear to walk in a continuous straight line in the virtual world without ever reaching the physical arena boundaries. The 3D-VR system could for example map walking in the real world direction north-north-east as walking due north in the virtual world. Thus walking in a straight line in the virtual world is caused by the person walking in a large circle in the real world. In the scenario of FIG. 3c, the 3D-VR system defines a real-world 2-D circle on the arena surface that maps onto a circular path circumnavigating the outer surface of the object. As the person 330 moves around the outer surface 325, the 3D-VR system augments the visual display with other sensory experiences including a) sounds to indicate feet connecting with the surface; and b) vibrations as the feet connect with the surface. In this example scenario, person 330 has tracking markers 335 attached to his or her feet or footwear. The tracking markers 335 allow the 3D-VR system to track the locations of the fee of person 330. As person 305 moves further to the right in the real world, the 3D-VR system moves the person's location in the virtual world along the outer surface 325. In this scenario, the 3D-VR system keeps the person's virtual orientation perpendicular to the virtual surface. In some scenarios, the VR allows a person to circumnavigate the object and thereby return to the original location.

Figure 4A:
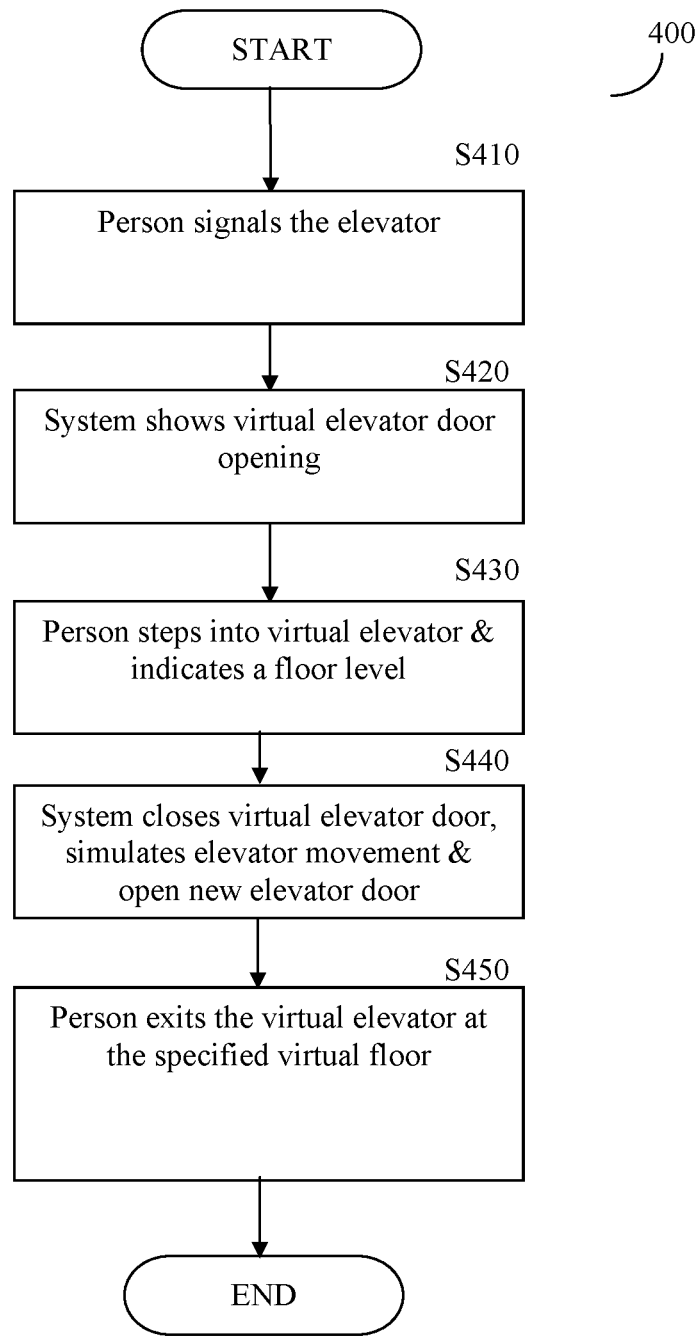
FIG. 4a shows an exemplary flowchart for a person transitioning to a new elevation.

FIG. 4a shows an exemplary flowchart 400 for a person transitioning to a new elevation using a virtual elevator. The exemplary flowchart outlines the steps taken by the 3D-VR system while simulating a virtual elevator. In S410 the person signals a virtual elevator.

In a first scenario, the person pushes a physical button located within the arena. The physical button is connected to the 3D-VR system through a wired or wireless connection so that the 3D-VR system can detect when the button is pushed. The person sees only the virtual world and needs to approach the button and press it. The 3D-VR system displays the physical button within the virtual world at a location expected by the person. Pushing the button within the physical world corresponds to pushing the button in the virtual world and sends a signal to the 3D-VR system. The 3D-VR system augments the visual display, and physical button pushing experience with appropriate sound.

In a second scenario, the person pushes a virtual elevator button. The 3D-VR system creates a virtual elevator button and displays that virtual elevator button to the person. The 3D-VR system determines when the person's hand, arm, body or controller touches the virtual elevator button by tracking the locations of the person's hand, arm, body and controller. The 3D-VR system applies tracking markers to person's hand, arm, body and controller so that the tracking cameras can locate them. The 3D-VR system augments the visual display, and virtual button experience with appropriate sound to indicate button-pushing.

In a third scenario, the person uses a controller to signal the opening of the elevator. The person's actions include: a) pressing an 'open' button on the controller; b) pointing the controller at a virtual elevator button and clicking a button or trigger; c) pointing the controller at a virtual elevator door and shooting.

In a fourth scenario, the person uses hand or body movements to signal the opening of the elevator. The 3D-VR system tracks the location of hands and body parts by using tracking markers that are monitored by cameras.

In S420 the 3D-VR system shows the virtual elevator door opening. The 3D-VR system augments the visual display with appropriate sound such as the sound of elevator door opening. The person sees a virtual elevator through the opening door.

In S430 the person walks through the open virtual elevator door by walking through the arena and indicates a destination floor. The person indicates the destination floor using, for example, one of the previously mentioned methods of pushing a real or virtual button, using the controller or making a hand or body gesture.

In S440 the 3D-VR system closes the virtual elevator door and simulates elevator movement using sound and vibrations. After a suitable delay the 3D-VR system stops the simulated movement and opens a new elevator door. In S450 the person exits the virtual elevator door by walking through the arena.

FIG. 4a gives a specific, detailed example of how the 3D-VR system simulates a person changing elevation, i.e., using a virtual elevator. The VR supports many different methods of simulating elevation change. In a second example the 3D-VR system simulates a person using a circular staircase. As a person walks in a tight circle in the arena the 3D-VR system display the person ascending or descending the circular staircase in the virtual world. In a third example the person moves in the arena and enters a virtual moving staircase. When the person stands on the virtual staircase the 3D-VR system simulates movement by showing moving images. In a fourth example the person ascends a virtual cliff by walking up a switch-back path.

Figure 4B:
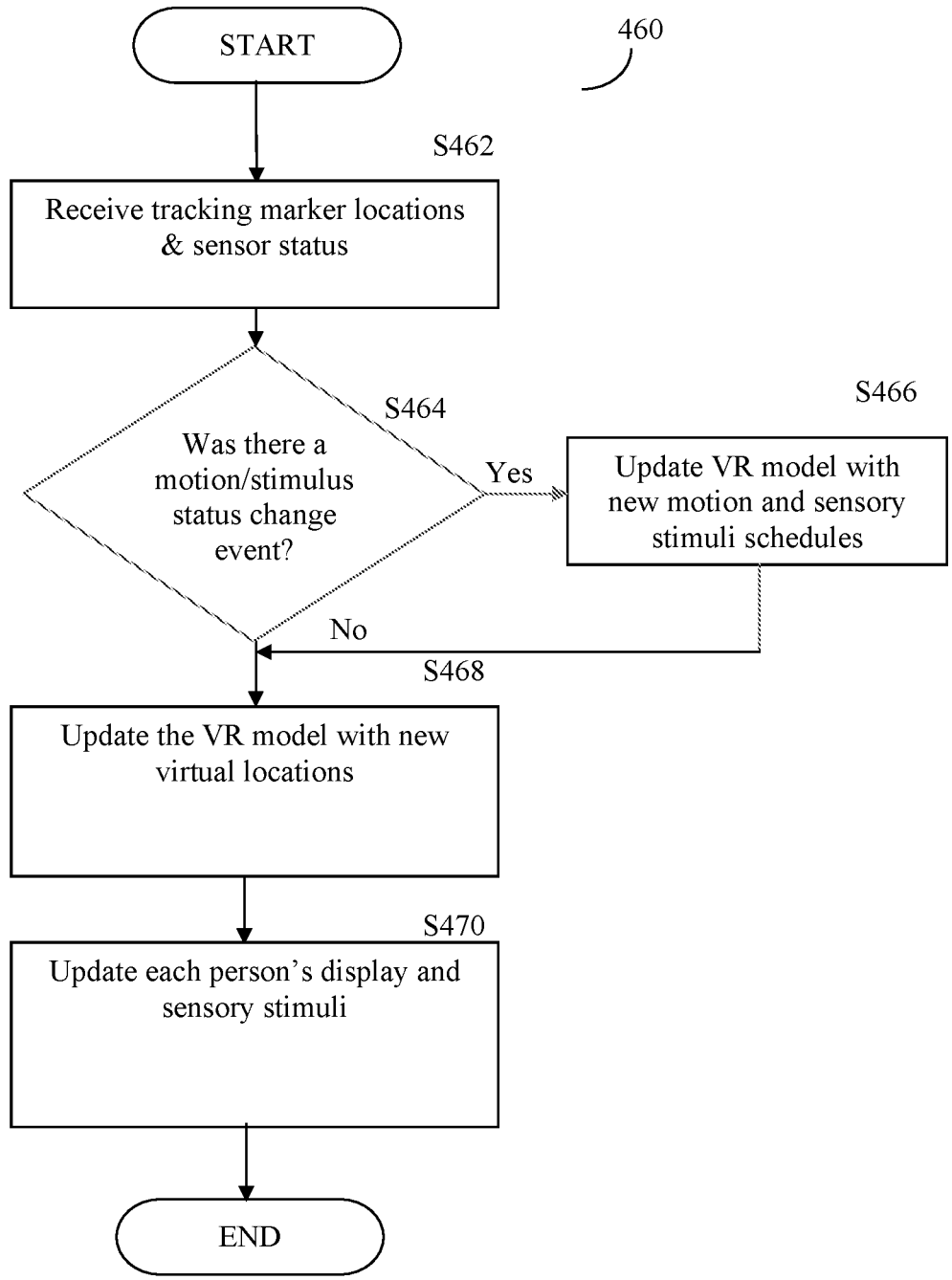
FIG. 4b shows an exemplary flowchart showing the actions of the 3D-VR server.

FIG. 4b shows an exemplary flowchart 460 showing the actions of the 3D-VR server within the 3D-VR system. The 3D-VR system repeats the steps of flowchart 460 throughout the VR simulation.

In S462 the 3D-VR server receives tracking marker locations and sensor inputs. As explained in further detail below, the cameras detect the tracking markers on the people or controllers and communicate the images with the tracking markers to the 3D-VR server. As explained in further detail below, the 3D-VR server receives sensor inputs from sensory enhancement devices, such as mechanical buttons, microphones and other types of sensors.

In S464 the 3D-VR server determines if there was a motion or sensory stimulus status changing event. Motion and sensory stimulus status changing events are events that cause changes to sensory stimulation and/or motion of a virtual world object. Motion and stimulus status changing events include a) activating a physical sensor, e.g., pressing a button; b) activating a virtual sensor by a person's body movement; c) activating a virtual sensor with a controller action e.g., pressing a controller button. As explained in further detail below, to determine whether a motion changing event has occurred, the 3D-VR server checks physical sensor status, controller status and analyzes the camera images and searches for tracking markers within each image. The 3D-VR server uses pixel locations of the tracking markers within the camera images to construct 3-dimensional vectors from the cameras' known locations to the tracking markers and determines the tracking marker arena locations by computing the closest point of the 3-dimensional vector intersections. The 3D-VR server uses changes in the location of tracking markers on the hands to determine if a person has activated a virtual sensor. The 3D-VR server uses changes in the arena location of a player's tracking markers to determine changes in the VR world location. If these changes in VR world location cause the person to enter a specific virtual area as described above, then a motion changing event has occurred.

If the 3D-VR server determines that there was a motion or sensory stimulus status changing event the 3D-VR server executes step S466, otherwise it continues at S468. In S466 the 3D-VR server updates the VR model by marking object motion schedules and sensory stimuli schedules. For example, when the 3D-VR server detects the pushing an elevator call button the 3D-VR server updates the VR model in the following ways: a) the 3D-VR server updates the elevator door's motion schedule, e.g., to start opening in 2 seconds, open with a given door opening velocity for a specified duration; b) the 3D-VR server updates the elevator car and elevator car occupants motion schedule; c) the 3D-VR server updates the sensory stimulus schedule. An object's motion schedule defines its velocity at different points in time, for example people in a moving virtual elevator will have a vertical velocity for a specified period of time. The sensory stimulus schedule defines what sensory stimuli each person receives at different times. For example, people in a moving elevator will feel vibrations for a specified period of time and hear moving elevator sounds for a specified period of time. When the 3D-VR server updates the VR model by marking object motion and sensory stimuli schedules the 3D-VR server removes previously assigned object motion and sensory stimuli schedules. For example, if one person moves to a position that obstructs the virtual elevator doors the 3D-VR server removes any 'closing door' motion schedule and replaces it with an 'opening door' motion schedule. After step S466 the 3D-VR server continues at S468.

In S468 the 3D-VR server updates the VR model with new object locations. The 3D-VR server computes an x-y arena location for each person by averaging that person's tracking marker locations. By comparing the current computed x-y arena location to the previously computed x-y arena location, the 3D-VR server determines an arena-motion vector. The 3D-VR server uses the arena-motion vector to compute a VR model motion vector. The VR model defines the arena-motion vector mapping onto the VR model motion vector. In the simple case, an arena movement of 10 cm in the North direction translates into a VR model movement of 10 cm in the North direction. In other cases, the VR model may define a different direction, different magnitude of movement and a change in elevation. The arena-motion vector mapping to the VR model motion vector strategy depends on a person's location within the VR world. The 3D-VR server adjusts the VR model based on any motion schedule determined in S466. For example, a person may move 10 cm to the right in the arena and move both 10 cm to the right and 10 cm vertically if he or she is in a virtual moving elevator.

In S470 the 3D-VR system updates people's displays and applies the appropriate sensory stimulation. Each person's display shows a picture of the VR world as seen from that person's virtual location and orientation.

Figure 5:
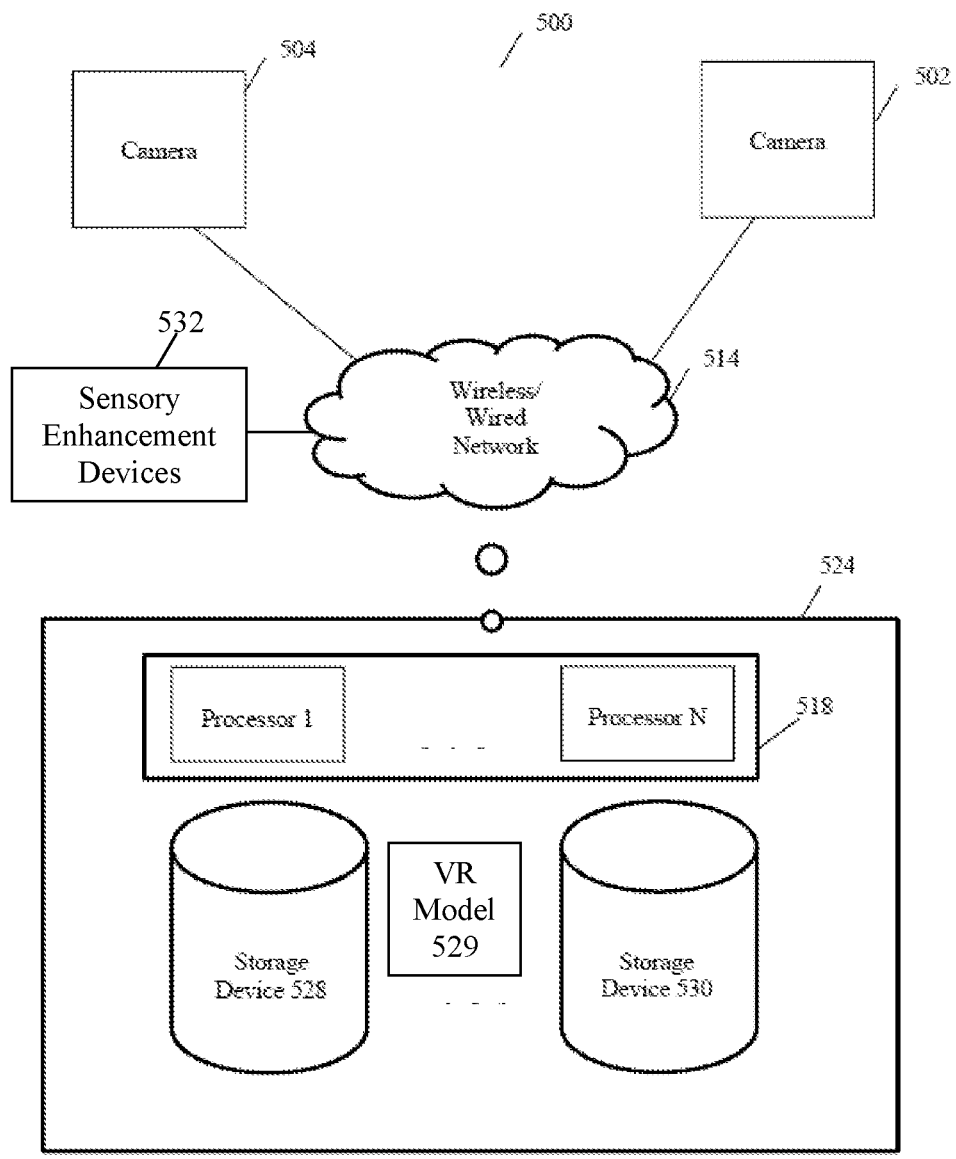
FIG. 5 depicts a block diagram of an arena-based VR system, according to an exemplary embodiment.

FIG. 5 depicts a block diagram of a 3D-VR system 500, according to another exemplary embodiment. The system 500 includes Cameras 502 and 504, sensory enhancement devices 532 and 3D-VR server 524. The 3D-VR server 524 obtains tracking marker 108 locations by analyzing the camera 502 and 504 images. The 3D-VR server 524 obtains sensor status by reading from sensory enhancement devices 532. The cameras, 502 and 504, may be capable of communicating with the 3D-VR server 524 either directly or indirectly over a network 514. The cameras, 502 and 504, may communicate with the 3D-VR server 524 over the network 514 using wireless or wired connections supporting one or more point-to-point links, shared local area networks (LAN), wide area networks (WAN), or other access technologies. These cameras 502 and 504 may be transmitting video, audio or other kinds of data to the 3D-VR server 524. The sensory enhancement devices 532 include mechanical buttons, haptic devices, sensors, (e.g., buttons or microphones) and vibration plates. The 3D-VR server 524 sends commands to the sensory enhancement devices 532 to enhance people's sensory experience based on people's movement and actions. The sensory enhancement devices communicate with the 3D-VR server 524 over the network 514 using wireless or wired connections.

The 3D-VR server 524 constructs a VR model 529 that is held on a storage medium such as computer memory. The VR model 529 represents the VR world and contains people's and object's VR world locations. The 3D-VR server 524 updates VR model 529 as people and objects move. The 3D-VR server 524 uses VR model 529 to generate individual displays for each person.

According to the exemplary embodiment depicted in FIG. 5, the 3D-VR system 500 is a type of system that provides tracking of tracking markers using cameras 502 and 504 using storage devices 528, 530 and multiple processors 518. However, it should be appreciated that alternate embodiments of the 3D-VR system 500 may use a single processor and storage device and the depicted embodiment is merely exemplary. Furthermore, although FIG. 5 depicts a single server 524, the 3D-VR system may comprise multiple servers splitting up the functionalities which are performed by the depicted server 524. The 3D-VR server 524 may be realized as a software program stored in a memory and executing on a central processing unit (CPU).

The 3D-VR server 524 creates a virtual world simulation and maps people movements and actions in the physical arena into movements and actions within the virtual world. The 3D-VR system sends information to a display device being used by the user. The display device may be incorporated on the controller according to an exemplary embodiment. Another exemplary embodiment of the display device is the VR headset 140 as depicted in FIG. 1.

Figure 1:
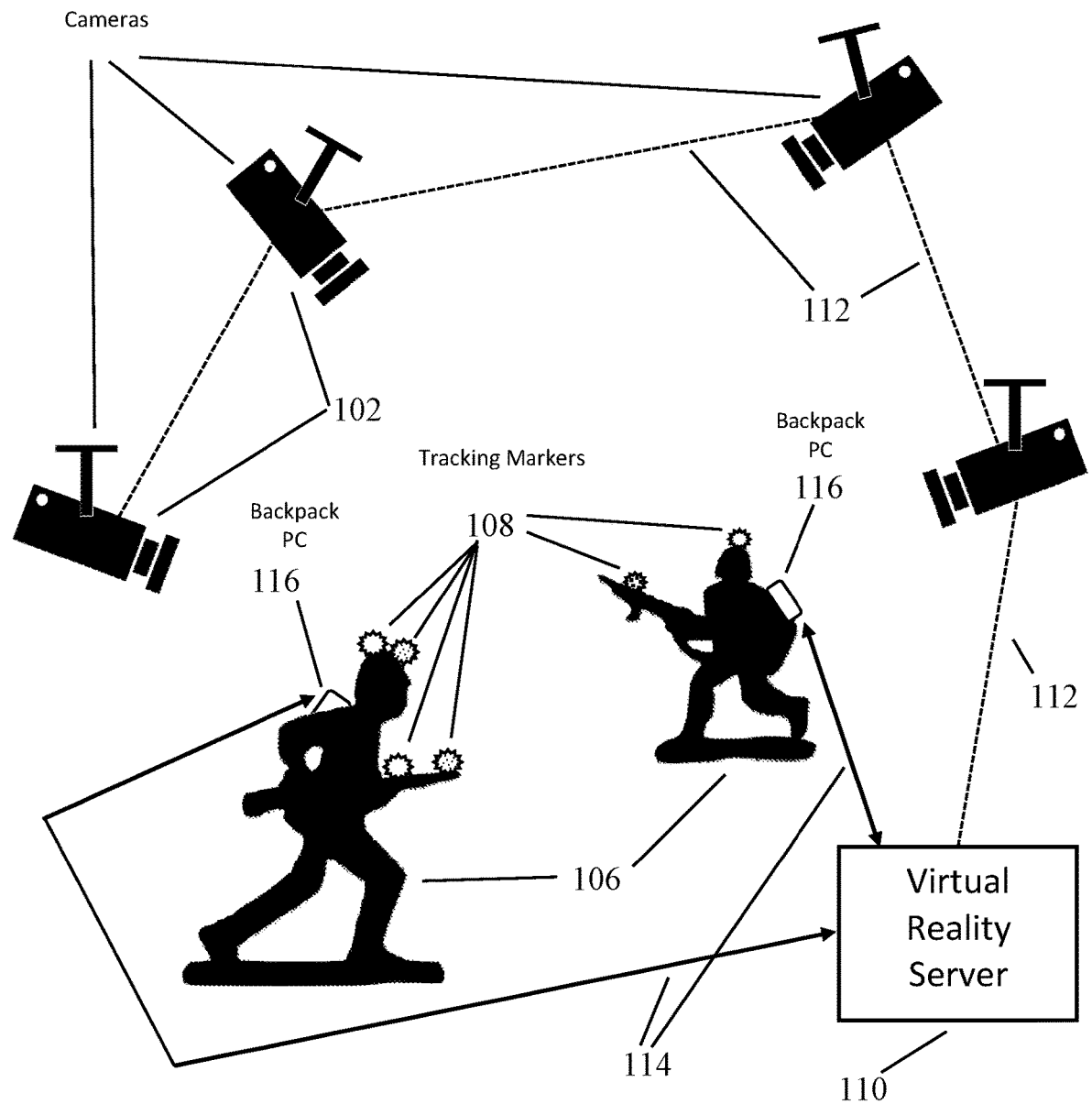
FIG. 1 shows a prior-art diagram of an exemplary arena-based VR system.

The 3D-VR server 524 may use video images from the tracking cameras 130 and approximate orientation information provided by the controller being used by the user (not depicted in FIG. 5, depicted in FIG. 1). In a preferred embodiment, the 3D-VR server 524 receives video images over video cables connected to the cameras; however the images may be transferred wirelessly. Possible video cable types include analog formats such as composite video, S-Video and VGA; and digital formats such as HDMI and DVI, however these are mere exemplary embodiments and the possibilities are not limited thereto. In another embodiment, the 3D_VR server 524 receives video images over a wireless communication connection.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture.

Preferably, the machine is implemented on a computer platform having hardware such as one or more central processing units ("CPUs"), one or more memories, and one or more input/output interfaces. The computer platform may also include an operating system and micro-instruction code. The various processes and functions described herein may be either part of the micro-instruction code or part of the application program, or any combination thereof, which may be executed by a CPU, whether or not such computer or processor is explicitly shown. In addition, various other peripheral units may be connected to the computer platform such as an additional data storage unit and a printing unit.

Although a number of possible implementations have been mentioned, these are presented merely for the sake of explanation and teaching, and are not limitative. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention has been described in relation to particular examples, which are intended in all respects to be illustrative rather than restrictive. Those skilled in the art will appreciate that many different combinations will be suitable for practicing the present invention. Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A system comprising:
    a virtual reality server comprising a memory containing machine readable medium comprising machine executable code having stored thereon instructions for operating a control system comprising at least one processor coupled to the memory,
    wherein the virtual reality server constructs a 3-dimensional virtual reality world model representing the virtual reality simulation,
    wherein the virtual reality server determines 2-dimensional arena movements for a first person and a second person, maps 2-dimensional arena movements of the first person and the second person into at least one 3-dimensional movement within the 3-dimensional virtual reality world model, and outputs a representation of the 3-dimensional virtual reality world model,
    wherein the virtual reality server partitions the arena into two or more separate areas,
    wherein the two or more separate areas represent different fixed elevations in the 3-dimensional virtual reality world model,
    wherein the virtual reality server determines the elevation of the first person in the 3-dimensional virtual reality world model based on the area of the arena that the first person occupies and determines the elevation of the second person in the 3-dimensional virtual reality world model based on the area of the arena that the second person occupies,
    wherein the first person is determined to be at a first elevation in the 3-dimensional virtual reality world model and the second person is determined to be at a second elevation, and wherein the first person and the second person are visible to each other at respective first and second elevations in the 3-dimensional virtual reality world model, and
    wherein the virtual reality server discourages at least one of the first person and the second person from directly transitioning from a first partitioned area of the two or more separate areas to a second partitioned area of the two or more separate areas by providing at least one of an auditory cue and a sensory cue, wherein the auditory cue comprises sounding an alarm and wherein the sensory cue comprises a vibration of a backpack or controller.

2. The system of claim 1, wherein the virtual reality server recognizes at least one of the first person and the second person has transitioned between the different elevations by detecting movement of the at least one of the first person and the second person to one of the two or more separate areas.

3. The system of claim 2, wherein the virtual reality server enables the at least one of the first person and the second person in a first partitioned area of the two or more separate areas to see two or more people in a second partitioned area of the two or more separate areas in the 3-dimensional virtual reality world model.

4. The system of claim 1, wherein the virtual reality server partitions the arena into two or more separate areas based on a status of a simulation scenario.

5. The system of claim 1, wherein the two or more separate areas are separated by a transition area, and the transition area represents one of an elevator, a lift, an escalator, or a spiral staircase.

6. The system of claim 1, wherein the two or more separate areas are separated by a transition area, and the transition area contains an input sensory enhancement device.

7. The system of claim 6, wherein the input sensory enhancement device is a button.

8. The system of claim 1, wherein the virtual reality server associates the 2-dimensional arena movement to walking on a non-flat outer surface of an object in the 3-dimensional virtual reality world model and wherein the orientation of the at least one person in the 3-dimensional virtual reality world model is perpendicular to the non-flat outer surface.

9. The system of claim 8, wherein the virtual reality server associates the 2-dimensional arena movement to circumnavigation of the non-flat outer surface of the object in the 3-dimensional virtual reality world model.

10. The system of claim 1, wherein the virtual reality server further re-partitions the arena into two or more separate areas over time.

11. A computerized method for mapping movements in an arena into a 3-dimensional virtual reality world comprising:
    receiving images of an arena in which a first person and a second person are participating in a virtual reality simulation,
    constructing a 3-dimensional virtual reality world model representing the virtual reality simulation,
    determining 2-dimensional arena movements for first person and the second person in the received images and mapping 2-dimensional arena movements of the first person and the second person into at least one 3-dimensional movement within the 3-dimensional virtual reality world model,
    outputting a representation of the 3-dimensional virtual reality world model for display on at least one of a plurality of displays,
    partitioning the arena into two or more separate areas, wherein the two or more separate areas represent different fixed elevations in the 3-dimensional virtual reality world model,
    determining the elevation of the first person in the 3-dimensional virtual reality world model based on the area of the arena that the first person occupies and determining the elevation of the second person in the 3-dimensional virtual reality world model based on the area of the arena that the second person occupies,
    wherein the first person is determined to be at a first elevation in the 3-dimensional virtual reality world model and the second person is determined to be at a second elevation, and wherein the first person and the second person are visible to each other at respective first and second elevations in the 3-dimensional virtual reality world model, and discouraging at least one of the first person and the second person from directly transitioning from a first partitioned area of the two or more separate areas to a second partitioned area of the two or more separate areas by providing at least one of an auditory cue and a sensory cue, wherein the auditory cue comprises sounding an alarm and wherein the sensory cue comprises a vibration of a backpack or controller.

12. The computerized method of claim 11, further comprising recognizing that one or more people transitioned between one or more of the two or more separate areas and adjusting the virtual reality simulation to symbolize a transition between the different elevations.

13. The computerized method of claim 12, wherein the one or more people in a first partitioned area can see two or more people in a second partitioned area in their respective displays of the 3-dimensional virtual reality world model.

14. The computerized method of claim 11, wherein partitioning the arena into two or more separate areas is based on a status of a simulation scenario.

15. The computerized method of claim 11, wherein the two or more separate areas are separated by a transition area, the transition area represents one of an elevator, a lift, an escalator, or a spiral staircase.

16. The computerized method of claim 11, wherein the two or more separate areas are separated by a transition area, the transition area contains an input sensory enhancement device.

17. The system of claim 16, wherein the input sensory enhancement device is a button.

* * * * *